Feb. 3, 1959 B. REICH 2,872,644
MEASUREMENT OF TRANSISTOR THERMAL RESISTANCE
Filed Dec. 10, 1956

INVENTOR,
BERNARD REICH.
BY
*Harry M. Saragovitz*
ATTORNEY

United States Patent Office 2,872,644
Patented Feb. 3, 1959

2,872,644

MEASUREMENT OF TRANSISTOR THERMAL RESISTANCE

Bernard Reich, Wanamassa, N. J., assignor to the United States of America as represented by the Secretary of the Army Application December 10, 1956, Serial No. 627,520

3 Claims. (Cl. 324—158)

(Granted under Title 35, U. S. Code (1952), sec. 266)

The invention relates to a technique of transistor manipulation ancillary to the measurement of transistor parameters and particularly to a process which enables the measurement of transistor thermal resistance.

It is well known that the operating characteristics of a transistor change with a change in temperature. It is therefore important that information relating to the nature and extent of this effect be available if a proper evaluation and application of the transistor is to be made. This information is obtainable from the measurement of transistor thermal resistance, which may be expressed algebraically as follows:

$$\frac{(T_{j_1} - T_{a_1}) - (T_{j_2} - T_{a_2})}{P_1 - P_2}$$

where $T_{j_1}$, $T_{a_1}$, and $P_1$, represent junction temperature, ambient temperature, and collector power dissipation, respectively, for a first operating point; $T_{j_2}$, $T_{a_2}$, and $P_2$ are similarly representative of a second operating point. The expression ambient temperature, as used herein, indicates both the transistor case temperature and environmental temperature inasmuch as in practicing the invention they are maintained substantially identical.

In practice the solution of the equation for thermal resistance is complicated by the difficulty in measuring the transistor junction temperature while the transistor is dissipating power. Previously the principal method was by means of a thermocouple embedded in the transistor near the collector junction. However, since only such specially equipped transistors, largely limited in practice to design samples, could be tested by this method, it has failed to meet the need of the transistor manufacturer.

Another method is described by J. Tellermman in the April 1954 issue of Electronics Magazine, pages 185-187. Junction temperature is measured by a two stage manipulative method involving a comparison of values of collector cutoff current, i. e., the collector current with the emitter circuit open, which is known to vary as a function of temperature. First, the transistor is placed in an oven, the temperature varied, and a correlation of temperature vs. collector cutoff current established. Second, it is removed from the oven, the junction reheated by applying operating potentials, the emitter circuit intermittently opened for collector cutoff current observation, and a correlation of collector cutoff current vs. collector power dissipation established. By combining the results of these steps junction temperature can be calculated as a function of collector power dissipation.

While the Tellerman method eliminates the need of making special thermocouple equipped transistors and thus may be applied to normal production testing, it is somewhat complex for this purpose since it requires two experimental tests and a correlation of these tests. Further, one of the tests, the oven heating test, appears lengthy, since the oven temperature must be maintained sufficiently long at one value to insure that the internal junction temperature has reached oven temperature. A further disadvantage is that with different transistor sizes, shapes, or materials, the oven test time must be redetermined.

The general objects of this invention are to further simplify the process of determining thermal resistance and to reduce the time that such process requires.

In accordance with the invention the following steps are performed with a transistor to which first normal operating polarity biases have been applied: the ambient temperature is adjusted to a first value, then the inter-electrode bias is adjusted to provide a first selected value for collector power dissipation which is arbitrarily chosen within the known operating range of the transistor; the emitter circuit is periodically interrupted during which interruption only collector cutoff current flows, the period of interruption being sufficiently short to prevent significant collector junction cooling; next the transistor ambient temperature is readjusted to a second value, and then the inter-electrode bias is readjusted to provide a second value for collector power dissipation which is such as will produce the same collector cutoff current for the same collector cutoff voltage as existed during the first adjusted condition.

As previously noted, junction temperature and collector cutoff current are dependent variables. By holding collector cutoff current constant for a given value of collector cutoff voltage, as indicated by the invention, it may be assumed that junction temperature as well has been held constant. In this manner the terms $T_{j_1}$ and $T_{j_2}$ of the equation for thermal resistance may be made identical and will cancel. Then from the parameters revealed by the invention, thermal resistance may be computed as the difference between the first and second values of ambient temperature divided by the difference between the first and second values of collector dissipation power.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawings in which:

Figure 1:
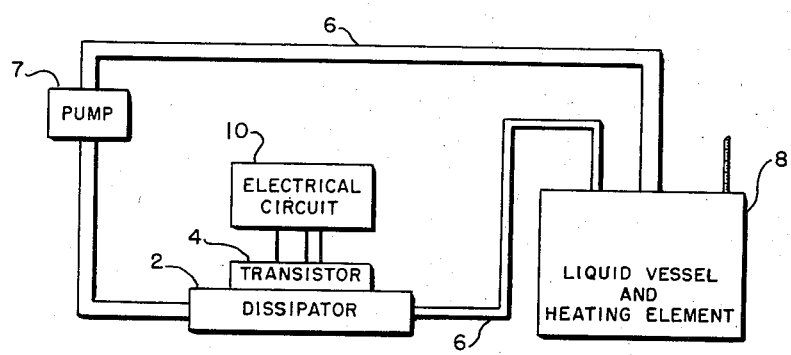
Fig. 1 shows a block diagram of the invention.

Referring to Fig. 1 there is shown a heat dissipating block 2 upon which is mounted transistor 4 to be tested. A tube 6, through which a heat conducting liquid flows connects in a closed loop the dissipating block 2, circulating pump 7, and a liquid storage vessel 8, the latter containing a heating element and thermometer. The transistor is connected to an electrical circuit 10 which is set forth in detail in Fig. 2.

Figure 2:
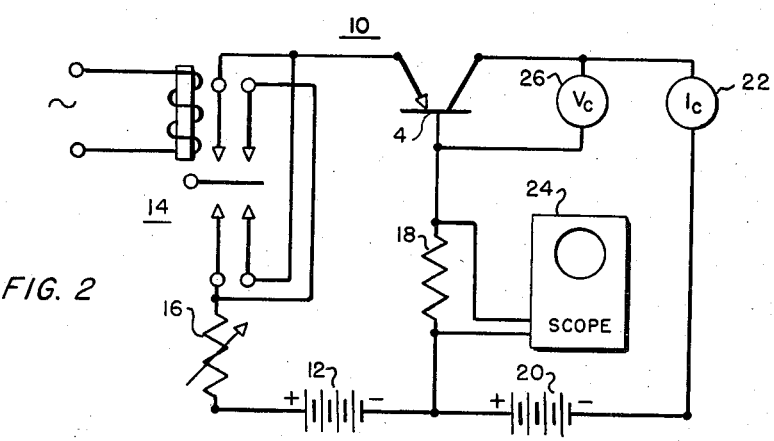
Fig. 2 shows a schematic wiring diagram of one of the components of Fig. 1.

Fig. 2 shows transistor 4 with an emitter bias source 12 connected in a forward direction between the emitter and base of the transistor through the contacts of vibrating magnetic switch 14, variable bias resistor 16, and base resistor 18. A collector bias source 20 is connected in a reverse direction through collector current ammeter 22 and base resistor 18 between the collector and base of the transistor. An oscilloscope 24 is connected across base resistor 18 for measurement of collector cutoff current during the period when switch 14 is open. It has been found that a switch which oscillates between a closed 15 millisecond period and an open 3 millisecond period is satisfactory from the standpoint of enabling the observation of collector cutoff current without causing substantial junction cooling. Voltmeter 26 is connected between the base and collector of the transistor. The product of the voltage indicated by voltmeter 26 and the current indicated by ammeter 22 is a measure of collector power dissipation.

A collector voltage of 28 volts and base resistor of 200 ohms has been found to be a satisfactory combination for germanium transistor measurements. With silicon transistors, the collector cutoff current is smaller and the base resistor should be of larger value in order to increase the oscilloscope indication of cutoff current. In addition, to prevent excessive voltage during the "on" period of operation, a clamping diode should be placed across the resistor.

In practicing the method of the invention, power is applied to the heating element in vessel 8 and the temperature of the circulating liquid raised to a first value, $T_{a_1}$. Variable resistor 16 is then adjusted to provide a first collector power dissipation value, $P_1$, which produces a collector cutoff current of an arbitrary value within the operating range. Next the liquid temperature is raised to a second value, $T_{a_2}$, and variable resistor 16 readjusted to change the power dissipation to a second value, $P_2$, which corresponds to the operating point at which the collector cutoff current returns to its first value. Finally, thermal resistance may be calculated, as previously explained, from the equation $(T_{a_1}-T_{a_2})/(P_1-P_2)$. The complete process may be simply and accurately performed in approximately 45 seconds.

Figure 3:
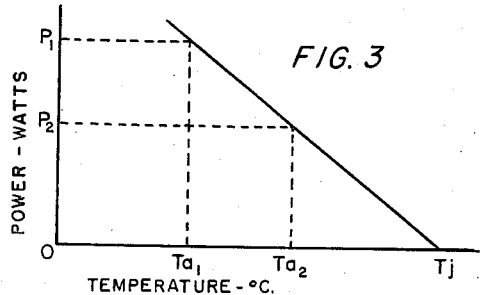
Fig. 3 shows a graph illustrative of the method of the invention.

Fig. 3 shows graphically a plot of the equation for thermal resistance with the slope of the curve denoting the solution. If desired, the junction temperature, $T_j$ may also be ascertained from the plot as it corresponds to the ambient temperature at which P would be zero.

The invention described herein may be manufactured and used by or for the Government for governmental purposes, without the payment of any royalty thereon.

What is claimed is:

1. The method of measuring transistor thermal resistance comprising: applying normal operating polarity biases to the transistor; adjusting the transistor ambient temperature to a first value; adjusting the inter-electrode bias to provide a first selected value for collector power dissipation which is arbitrarily chosen within the known operating range of the transistor; periodically interrupting the emitter circuit during which interruption only collector cutoff current flows, the period of interruption being sufficiently short to prevent significant collector junction cooling; readjusting the transistor ambient temperature to a second value; and readjusting the inter-electrode bias to provide a second value for collector power dissipation which is such as will produce the same collector cutoff current for the same collector cutoff voltage as existed during the first adjusted condition; the difference between said ambient temperature divided by the difference between said values of power dissipation being the transistor thermal resistance.

2. The process of transistor treatment incident to thermal resistance measurement comprising: adjusting the transistor ambient temperature to a first value; adjusting the emitter bias to provide a first value for collector power dissipation arbitrarily chosen within the known operating range of the transistor; periodically interrupting the emitter circuit during which interruption only collector cutoff current flows, the period of interruption being sufficiently short that significant collector junction cooling does not occur; readjusting the transistor ambient temperature to a second value; readjusting the emitter bias to provide a second value for collector power dissipation which occurs at a point where collector cutoff current is the same as during the first adjusted condition; the difference between said ambient temperatures divided by the difference between said values of power dissipation being the transistor thermal resistance.

3. The process of transistor treatment for thermal resistance measurement comprising; placing the transistor in a medium capable of regulating the transistor ambient temperature; connecting an emitter circuit between transistor base and emitter which alternately applies a forward bias to said emitter and then opens the emitter-base circuit; connecting a collector circuit between transistor collector and base which applies a reverse potential to said collector; adjusting said medium to a first ambient temperature; adjusting the forward bias to said emitter to provide a first collector power dissipation-collector current cutoff operating point with the collector cutoff current arbitrarily selected within the known operating range of the transistor; adjusting said medium to a second ambient temperature; adjusting said forward emitter bias to provide a second collector power dissipation-collector current cutoff operating point with the collector cutoff current identical to that of the first collector power dissipation-collector current cutoff operating point; the difference between said ambient temperatures divided by the difference between the collector power dissipation of said first and second operating points being the transistor thermal resistance.

References Cited in the file of this patent

Electronics, April 1954, pp. 185–187, Article by Tellerman.